(12) United States Patent
Duvinage et al.

(10) Patent No.: US 7,765,797 B2
(45) Date of Patent: Aug. 3, 2010

(54) EXHAUST GAS PURIFICATION SYSTEM FOR A MOTOR VEHICLE HAVING A REDUCING AGENT STORAGE TANK, AND ASSOCIATED OPERATING METHOD

(75) Inventors: Frank Duvinage, Kirchheim (DE); Christian Goerigk, Korb (DE); Berthold Keppeler, Owen (DE); Arno Nolte, Stuttgart (DE); Markus Paule, Korb (DE); Joachim Schommers, Allmersbach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/581,890

(22) PCT Filed: Nov. 27, 2004

(86) PCT No.: PCT/EP2004/013477

§ 371 (c)(1),
(2), (4) Date: Jun. 5, 2007

(87) PCT Pub. No.: WO2005/054636

PCT Pub. Date: Jun. 16, 2005

(65) Prior Publication Data

US 2007/0277502 A1 Dec. 6, 2007

(30) Foreign Application Priority Data

Dec. 6, 2003 (DE) ............................ 103 57 120

(51) Int. Cl.
*F01N 3/00* (2006.01)
(52) U.S. Cl. .................. 60/286; 60/274; 60/283; 60/295; 60/303; 73/117.1; 73/117.2; 73/117.3; 701/29; 701/30; 701/35; 702/183; 702/184

(58) Field of Classification Search .................. 60/274, 60/276, 277, 283, 285, 295, 301, 286, 303; 73/117.1, 117.2, 117.3; 701/29, 30, 31, 35; 702/182, 183, 184
See application file for complete search history.

(56) References Cited

U.S. PATENT DOCUMENTS 4,596,277 A * 6/1986 Djordjevic .................. 141/98

(Continued)

FOREIGN PATENT DOCUMENTS

DE 44 23 003 C2 1/1995

(Continued)

OTHER PUBLICATIONS

H.-O Herrmann, M.M. Hernier, V. Scholz, „Ein Festsoff SCR System fuer Diesel Pkw and leichte Nulzfahrzeuge (A Solid SCR System for Diesel Passenger Cars and Light Duty Trucks), Internationales Wiener Motorensymposium, H.P. Lenz (Hrsg.) VDI-Fortschritt-Berichte. Reihe 12 Nr.490, Band 2, S. 217-233, 2002.

(Continued)

*Primary Examiner*—Binh Q. Tran
(74) *Attorney, Agent, or Firm*—Crowell & Moring LLP

(57) ABSTRACT

An exhaust gas purification system for a motor vehicle having a reducing agent storage tank, and an associated operating method. In particular, an exhaust gas purification system for a motor vehicle, for which predetermined maintenance intervals is provided. The system includes a reducing agent storage tank for storing a reducing agent intended for exhaust gas purification. A method for operating a motor vehicle having an exhaust gas purification system and a reducing agent storage tank for storing a reducing agent intended for the exhaust gas purification, which comprises predetermined maintenance work after predetermined maintenance intervals is also provided.

17 Claims, 2 Drawing Sheets

U.S. PATENT DOCUMENTS

| | | | |
|---|---|---|---|
| 5,665,318 A | 9/1997 | Rembold et al. | |
| 5,758,496 A * | 6/1998 | Rao et al. | 60/295 |
| 5,763,771 A * | 6/1998 | Ott et al. | 73/114.75 |
| 5,964,089 A * | 10/1999 | Murphy et al. | 60/286 |
| 6,063,350 A * | 5/2000 | Tarabulski et al. | 423/239.1 |
| 6,192,676 B1 | 2/2001 | Zuerbig et al. | |
| 6,260,411 B1 * | 7/2001 | Esteghlal et al. | 73/118.1 |
| 6,363,771 B1 * | 4/2002 | Liang et al. | 73/23.31 |
| 6,502,390 B2 | 1/2003 | Goerigk et al. | |
| 6,876,908 B2 * | 4/2005 | Cramer et al. | 701/30 |
| 7,017,336 B2 * | 3/2006 | Stiermann | 60/286 |
| 2002/0081239 A1 | 6/2002 | Palesch et al. | |
| 2002/0134074 A1 | 9/2002 | Huthwohl et al. | |
| 2003/0068255 A1 | 4/2003 | Maurer et al. | |
| 2007/0075467 A1 * | 4/2007 | Osaku et al. | 266/81 |

FOREIGN PATENT DOCUMENTS

| | | |
|---|---|---|
| DE | 44 25 018 C1 | 6/1995 |
| DE | 198 25 148 A1 | 12/1999 |
| DE | 199 46 902 A1 | 4/2001 |
| DE | 100 38 741 A1 | 2/2002 |
| EP | 0 381 236 A1 | 8/1990 |
| EP | 1 092 466 A2 | 4/2001 |
| EP | 1 199 449 A2 | 4/2002 |
| EP | 1 211 394 A2 | 6/2002 |
| JP | 58023249 A | 2/1983 |
| JP | 5-222923 A | 8/1993 |
| JP | 6-117224 A | 4/1994 |
| JP | 2002-510005 A | 4/2002 |
| JP | 2002-371831 A | 12/2002 |
| JP | 2003-278532 A | 10/2003 |
| WO | 99/49957 | 10/1999 |

OTHER PUBLICATIONS

H. Lueders, R. Backes, G. Huethwohl, D.A. Ketcher, R.W. Horrocks, R.G. Hurley, and R.H. Hammerle, "An Urea Lean $No_x$ Catalyst System for Light Duty Vehicles," Fuels and Lubricants Meeting and Exposition, Toronto, Ontario, Oct. 16-19, 1995. Society of Automotive Engineers, SAE Technical Papers Series No. 952493, 1995.

"Heavy-Duty Standards/Diesel Fuel RIA - Dec. 2000: EPA420-R-00-026, Chapter III 'Emissions Standards Feasibility'" 2000.

* cited by examiner

EXHAUST GAS PURIFICATION SYSTEM FOR A MOTOR VEHICLE HAVING A REDUCING AGENT STORAGE TANK, AND ASSOCIATED OPERATING METHOD

CROSS REFERENCE TO RELATED APPLICATIONS

This application is a 371(c) National Stage of PCT/EP2004/013477 filed Nov. 27, 2004, which claims priority to German patent application No. DE 103 57 120.5 filed Dec. 6, 2003, the entire disclosures of which are hereby incorporated in their entireties.

FIELD OF THE INVENTION

The invention relates to an exhaust gas purification system for a motor vehicle, having a reducing agent storage tank for storing a reducing agent intended for exhaust gas purification, and to methods for operating and maintaining a motor vehicle having an exhaust gas purification system.

BACKGROUND

Exhaust gas purification systems of the abovementioned type are known for motor vehicles driven by diesel engines, which have what is known as an SCR catalytic converter for removing nitrogen oxides from the exhaust gas. This allows the reduction of nitrogen oxides from the exhaust gas fed to it even under oxidizing conditions, i.e., with an exhaust gas which has an excess of oxygen. However, a precondition for these systems is that a reducing agent, which has a selective activity with regard to the reduction of nitrogen oxides, must be added to the exhaust gas. Such reducing agents include, inter alia, primarily ammonia and substances which can release ammonia. In particular, urea or ammonium carbamate are customary and are preferably carried in a corresponding tank in the motor vehicle, preferably in the form of an aqueous solution. This reducing agent therefore constitutes an additional operating fluid which has to be refilled at regular intervals to ensure the long-term exhaust gas purification function. This represents additional outlay and requires careful handling to minimize associated risks, for example risks caused by incorrect usage of the reducing agent.

SUMMARY OF THE INVENTION

One object of the invention is to provide an exhaust gas purification system for a motor vehicle and a method for operating a motor vehicle having an exhaust gas purification system, which ensure correct, economical usage of a reducing agent intended for exhaust gas purification.

This object is achieved by an exhaust gas purification system for a motor vehicle having a predetermined maintenance interval, comprising a reducing agent storage tank for storing a reducing agent intended for exhaust gas purification, wherein the reducing agent storage tank is configured to have a capacity that is at least equal to a level predetermined by an assumed reducing agent consumption during the maintenance interval.

BRIEF DESCRIPTION OF THE DRAWINGS

Features and advantages of the present invention will become apparent to those skilled in the art from the following description with reference to the drawings, in which.

DETAILED DESCRIPTION OF PREFERRED EMBODIMENTS

Figure 1:
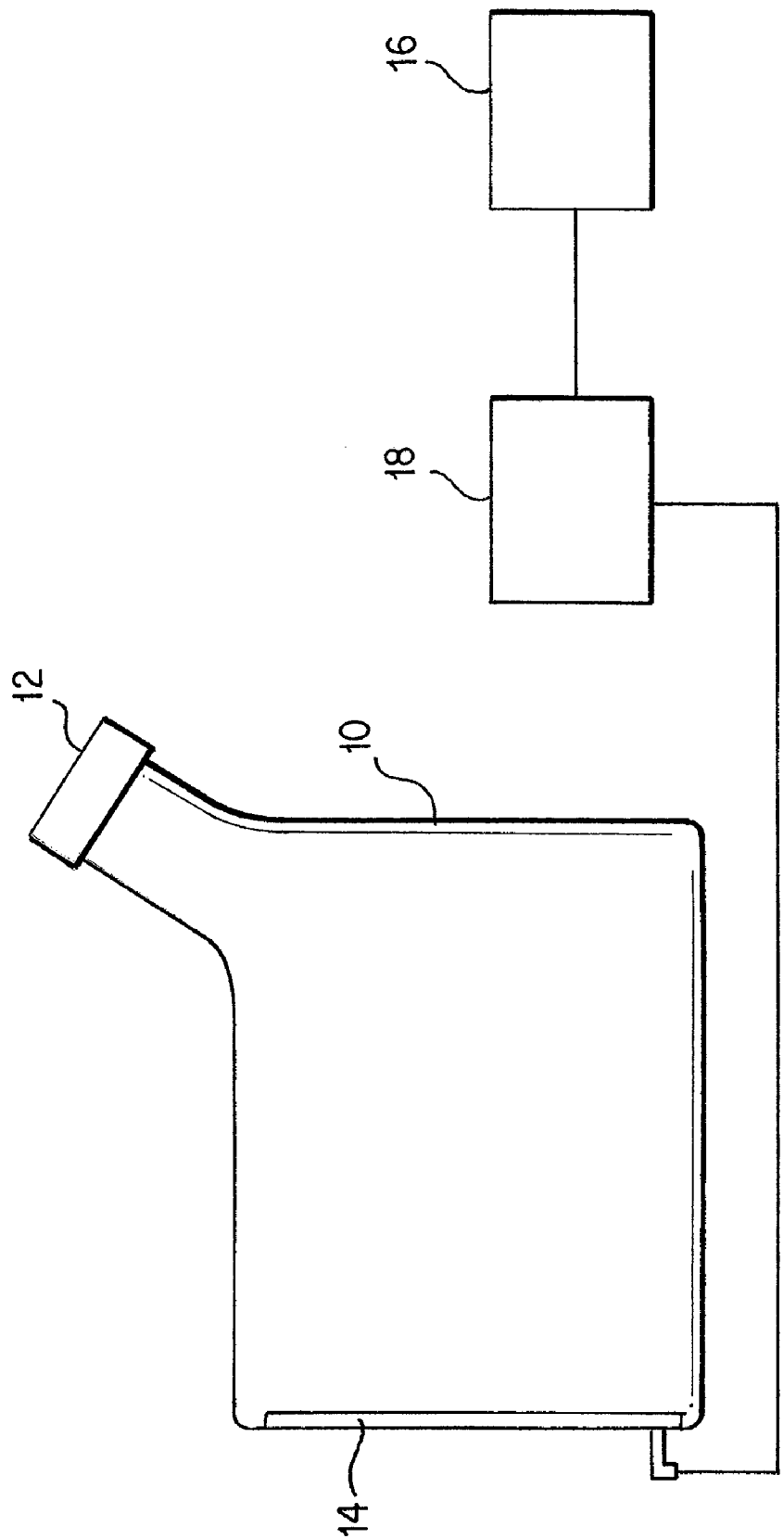
FIG. 1 is a diagram showing certain features of reducing agent tank and related components.

For simplicity and illustrative purposes, the principles of the present invention are described by referring mainly to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the true spirit and scope of the present invention. Before explaining the disclosed embodiments of the present invention in detail, it is to be understood that the invention is not limited in its application to the details of any particular arrangement shown, since the invention is capable of other embodiments. The terminology used herein is for the purpose of description and not of limitation.

The exhaust gas purification system according to the invention is distinguished by the fact that the filling capacity of the reducing agent tank is selected in such a way that it has a volume predetermined by an assumed reducing agent consumption during the maintenance interval.

Typically, maintenance intervals are generally provided for motor vehicles; after the end of these maintenance intervals, wearing parts require maintenance and/or consumables need to be replaced or refilled. With some consumables, such as wiper washer fluid, it is expedient if topping up can also be carried out by the owner or driver of the motor vehicle himself. In the case of other consumables, such as the transmission oil, owner maintenance may be undesirable, because there is a risk of incorrect handling. This also applies to the reducing agents which are used for exhaust gas purification purposes and are carried in the motor vehicle. The most suitable reducing agent is an aqueous solution of urea or ammonium carbamate, in which case incorrect handling, for example caused by inadvertently drinking or shaking the liquids, needs to be avoided. Moreover, it is desirable to relieve the owner of the vehicle of the need to check the availability of the additional operating fluid, in particular because if care is not taken, the reducing agent will not be refilled at the correct time, and consequently exhaust gas purification will no longer take place. These risks are avoided by dimensioning the reducing agent tank with respect to the vehicle maintenance intervals in accordance with the invention.

In the present context, the term maintenance interval is to be understood as meaning an interval, which is dependent on a running distance or a running time, between stipulated workshop visits as are customarily provided for maintaining proper operation of the motor vehicle. These are predetermined by the vehicle manufacturer according to certain criteria. The dimensioning of the reducing agent tank according to the invention makes it unnecessary to refill the reducing agent within the maintenance intervals, since the reducing agent tank is dimensioned in such a way that it can accommodate at least a quantity of reducing agent which is likely to be required within a maintenance interval. It is therefore possible for the reducing agent to be refilled exclusively during workshop visits by trained persons during the regular maintenance work. The need for the owner of the vehicle to hold stocks of the reducing agent and to refill the reducing agent is eliminated. This also eliminates the associated risks as well as the additional work on the part of the owner of the vehicle. Moreover, the outlay required to set up an extensive supply infrastructure, which is correspondingly expensive, is eliminated.

Figure 2:
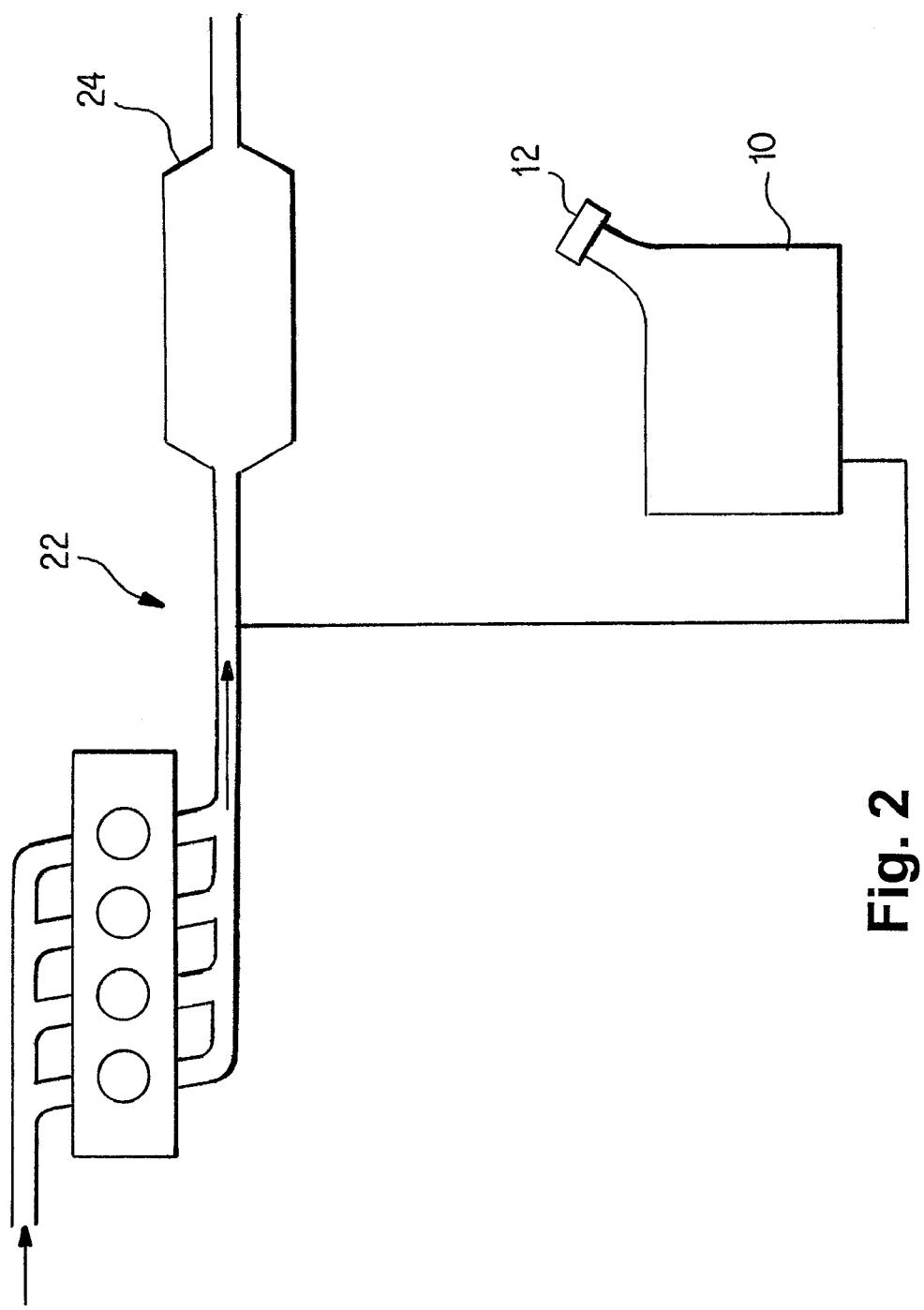
FIG. 2 is a diagram showing parts of an exhaust gas purification system.

In a configuration of the invention as shown in FIGS. 1 and 2, the reducing agent tank 10 has a closure apparatus 12 which is to be opened for refilling purposes. The closure apparatus is preferably configured to protect against being opened other than during a maintenance operation which is to be carried out by authorized maintenance persons after the maintenance interval has elapsed. This avoids the reducing agent being refilled by untrained persons, and the associated risks are eliminated. It is preferable for the reducing agent tank to be provided with a special closure which can only be opened by trained and/or authorized maintenance persons. By way of example, an electronically coded closure which can only be unlocked and opened by authorized persons is advantageous. Therefore, the handling of the reducing agent remains the responsibility of these trained persons, and danger to the environment, objects and people is avoided. Because monitoring of the level is no longer the responsibility of the vehicle owner, there is also no risk of the reducing agent not being refilled even when required, for example in order to save costs.

In another embodiment of the invention, level monitoring is provided, by components for level monitoring 14, for the purpose of monitoring the quantity of reducing agent that is present in the reducing agent tank, so that a warning signal is sent when the level drops below a residual filling quantity. This quantity is a factor of the remaining running time until the end of the maintenance interval and an assumed or calculated consumption rate. Accordingly, the driver of the motor vehicle is informed of a level which has dropped critically. This takes into account the reality that refilling may be necessary even before the end of a maintenance interval. Such maintenance intervals may be determined on the basis of other criteria. This is considered the equivalent of a maintenance interval expiring.

In another embodiment, a method is provided where a reducing agent storage tank for storing a reducing agent intended for exhaust gas purification is provided with a closure device for the reducing agent storage tank which may be locked such that it cannot be opened between maintenance intervals. During a maintenance operation it is unlocked and opened so the agent may be refilled. Therefore, within the maintenance interval the reducing agent tank cannot be opened, ensuring that the refilling of the reducing agent is carried out during the intended maintenance, for example in a franchised workshop.

In another embodiment of the method, the filling quantity of reducing agent in the reducing agent tank is determined, and a warning signal is output if this quantity drops below a predeterminable minimum filling level. In this way, notice of the need for unplanned maintenance on account of the level being too low is indicated in good time.

In another embodiment of the method, a consumption rate for the reducing agent is determined, and this information is used to determine the reducing agent consumption quantity which is to be expected by the end of the maintenance interval, and a warning signal is output if the expected consumption quantity exceeds the filling quantity. This procedure allows a realistic estimation of the predicted time of refilling. It is also possible to do without sending a warning signal if the remaining time or running distance until the intended time of refilling is longer than the time which is in any case intended for carrying out stipulated maintenance.

In a further embodiment of the method, after exceeding a predeterminable motor vehicle running distance following a warning signal being sent, intervention measures are taken in the operation of the motor vehicle, so as to effect a reduced consumption rate for the reducing agent. Therefore, if the signal warning of the need to refill the reducing agent is ignored, an emergency running mode may be set, in which the consumption of reducing agent is reduced, so that the range which otherwise remains is increased. It is preferable for the consumption of reducing agent to be reduced in such a manner that a predeterminable minimum exhaust gas purification function is still provided. As an additional measure, it is possible to input an entry into a readable error memory. If a predetermined motor vehicle running distance following a warning signal being sent is exceeded, it is also possible to provide for the vehicle drivability to be restricted, for example by activating a predeterminable speed limiter or engine speed limiter.

The text which follows describes advantageous embodiments of the invention by way of examples, including a motor vehicle with a diesel engine and an exhaust gas purification system 22 which comprises what is known as an SCR catalytic converter 24. These examples are provided solely for purposes of illustration and are not intended to be, nor should they be construed to be, limiting.

The SCR catalytic converter is preferably designed to reduce the levels of nitrogen oxides by using a selective reducing agent, which may, for example, be liquid ammonia or urea. In the text which follows, it is assumed that the reducing agent is urea, preferably in the form of an aqueous solution, which is carried with the vehicle in a tank provided for this purpose. The text which follows refers in general terms to a urea tank.

For the motor vehicle, there are stipulated maintenance intervals, at the end of which prescribed maintenance work, such as a transmission or engine oil change, needs to be carried out. This maintenance work is carried out in an authorized workshop. The stipulated maintenance intervals may differ in duration and depend primarily on the vehicle running distance together with consumption times for consumables or service lives of various components which are subject to wear.

According to the invention, the size of the urea tank is determined from the likely consumption of urea during a maintenance interval. Depending on the particular conditions, such as the installation space available, it is expedient to work on the basis of longer or shorter maintenance intervals. The consumption of urea within the maintenance interval is preferably determined from the nitrogen oxide emissions from the engine and the reduction in nitrogen oxide levels to be achieved by means of the use of urea. Since the nitrogen oxide emissions from the engine are dependent on driving conditions, it is in turn expedient to work on the basis of the maximum total nitrogen oxide emissions to be expected within the maintenance interval. Alternatively, it is possible to provide for the nitrogen oxide emissions which occur with a predeterminable probability during the maintenance interval to be used as the starting point. In this case, it is possible to make statistical statements about the probability of driving profiles and associated nitrogen oxide emissions.

A level monitoring device 18 is expediently provided for a urea tank which has been dimensioned in this way. This level monitoring device 18 can, on the one hand, record the occurrence of a predeterminable minimum filling level and cause a corresponding warning signal to be sent when this minimum filling level is reached. The warning signal preferably, at the same time, provides information about the residual running time or residual running time which is likely to remain. On the other hand, the level monitoring device 18 can also ascertain the current level on an ongoing basis and form a relationship between the previous consumption and the engine operating parameters or engine nitrogen oxide emissions which were in each case present. In this way it is possible to estimate the residual running time which remains with a high degree of accuracy. If it is ascertained that refilling is likely to be due before the end of the maintenance interval which is generally specified in any case, this information is also indicated, and it is preferable to reset the expiry of the maintenance interval according to the residual running time. A standard display unit 16 can be provided for outputting this information.

If refilling does not take place as indicated, to maintain a predeterminable minimum function of the exhaust gas purification device, it is advantageous to switch vehicle operation to an emergency running mode. This may comprise prohibiting certain engine operating points with a predeterminable increased emission of untreated nitrogen oxides. As an alternative or in addition, it is possible to reset engine maps, so as to lower the emission of nitrogen oxides from the engine, even if this is to the detriment of the fuel consumption. In this way, the residual running time which remains for the quantity of urea that is still available may be extended. In this context, it is also possible to provide for the urea metering strategy to be modified in such a manner that although the extent to which the nitrogen oxide levels are reduced decreases, it does not drop below a predeterminable level. It is in this way at least possible to limit the release of nitrogen oxides to the environment, which occurs to an increased extent when there is a shortage of urea or when the urea tank is empty. To make the urgency of refilling clear, it is also possible to provide for the drivability of the vehicle to be restricted, for example by automatic speed limiting and/or engine speed limiting, preferably in conjunction with the indication of a corresponding message to the vehicle operator or other person. The restrictions may also be gradual and become increasingly severe as the reducing agent becomes more and more scarce.

If the urea tank is completely emptied, it is even possible to provide for restarting of the vehicle to be prevented by a suitable block after the vehicle has been switched off. This prevents the vehicle from continuing to drive on the roads without an exhaust gas purification function. It is preferably provided, at any rate, that incorrect operation or lack of operation with regard to the urea metering be stored in a readable error memory by the corresponding information being input.

According to the invention, a special refill opening is provided for the urea tank. This opening is distinguished by a closure which is prevented from unauthorized opening, in particular during the maintenance interval. It is preferable for this closure to be such that it can only be opened during the intended maintenance work after a maintenance interval has elapsed, but otherwise locked. For this purpose, it is advantageous to provide a block, for example controlled by software, which can only be released by inputting a code so as to open up the refill opening; in this case, the code, by way of example, is only available to authorized workshops. It is also advantageous for a connection to an electronic control or diagnosis device to be provided for this block. The block can then be unlocked by a suitable connection, for example an adaptor provided for this purpose, which is preferably only available to workshop persons at an authorized workshop. To guarantee this function, it is also possible to provide for it to be necessary to input a code. Alternatively, a special key or a special tool which is only available to authorized persons can be provided for the closure. In the simplest case, it is also possible to prevent unauthorized opening of the closure by means of a seal.

These measures which have been outlined mean that the urea tank can only be refilled by authorized and trained persons, preferably at a franchised workshop. This avoids inappropriate or incorrect usage of the reducing agent, such as for example incorrect refilling, shaking or unintentional consumption. In addition to the safety function which has been outlined, refilling is also made simpler for the owner or driver of the vehicle, since the latter no longer has to refill the urea tank himself.

The foregoing description and examples have been set forth merely to illustrate the invention and are not intended to be limiting. Since modifications of the described embodiments incorporating the spirit and substance of the invention may occur to person skilled in the art, the invention should be construed broadly to include all variations within the scope of the appended claims and equivalents thereof.

The invention claimed is:

1. An exhaust gas purification system for a motor vehicle having a predetermined maintenance interval, comprising:
   a reducing agent storage tank for storing a reducing agent intended for exhaust gas purification, wherein the reducing agent storage tank is configured to have a capacity that is at least equal to a level predetermined by an assumed reducing agent consumption during the maintenance interval, and
   means for preventing a restarting of the vehicle after the vehicle has been switched off if the reducing agent storage tank is emptied.

2. The exhaust gas purification system of claim 1, wherein the reducing agent storage tank has a closure apparatus which is openable for refilling purposes, the closure apparatus being configured to protect against being opened other than during a maintenance operation.

3. The exhaust gas purification system of claim 1, wherein the reducing agent storage tank has a closure apparatus which is openable for refilling purposes, the closure apparatus being configured to protect against being opened other than by authorized persons.

4. The exhaust gas purification system of claim 1, wherein the reducing agent storage tank has a closure apparatus which is openable for refilling purposes, the closure apparatus being configured to protect against being opened other than after the maintenance interval has elapsed.

5. The exhaust gas purification system of claim 1, wherein said system is provided with components for level monitoring for the purpose of monitoring the quantity of reducing agent that is present in the reducing agent storage tank, so that a warning signal is sent when the quantity of reducing agent drops below a determined residual quantity.

6. The exhaust gas purification system of claim 5, wherein said residual quantity is determined based on an assumed consumption rate and the remaining running time until the end of the maintenance interval.

7. The exhaust gas purification system of claim 5, wherein said residual quantity is determined based on a measured consumption rate and the remaining running time until the end of the maintenance interval.

8. A method for maintaining a motor vehicle having an exhaust gas purification system and a reducing agent storage tank for storing a reducing agent intended for exhaust gas purification, comprising:
   preventing a restarting of the vehicle after the vehicle has been switched off if the reducing agent storage tank is emptied;

unlocking a closure device for the reducing agent storage tank, wherein said closure device is configured to only be openable during a maintenance operation; and filling the reducing agent storage tank.

9. The method of claim 8, wherein the steps of unlocking a closure device for the reducing agent storage tank and refilling the reducing storage tank are conducted during a maintenance operation.

10. The method of claim 8, wherein the steps of unlocking a closure device for the reducing agent storage tank and refilling the reducing storage tank are conducted after the end of the maintenance interval.

11. A method for operating a motor vehicle having an exhaust gas purification system and a reducing agent storage tank for storing a reducing agent intended for exhaust gas purification, comprising:

operating the motor vehicle;

switching the motor vehicle off;

preventing a restarting of the vehicle after the vehicle has been switched off if the reducing agent storage tank is emptied;

unlocking a closure device for the reducing agent storage tank, wherein said closure device is configured to only be openable during a maintenance operation; and filling the reducing agent storage tank.

12. A method for operating a motor vehicle having an exhaust gas purification system and a reducing agent storage tank for storing a reducing agent intended for exhaust gas purification, comprising:

operating the motor vehicle;

determining the quantity of reducing agent in the reducing agent storage tank and sending a warning signal if this quantity drops below a predetermined minimum quantity; and switching the motor vehicle off;

preventing a restarting of the vehicle after the vehicle has been switched off if the reducing agent storage tank is emptied; and unlocking a closure device for the reducing agent storage tank, wherein said closure device is configured to only be openable during a maintenance operation.

13. The method of claim 12, further comprising the steps of:

determining a consumption rate for the reducing agent, determining a reducing agent consumption quantity which is to be expected by the end of the maintenance interval, and sending a warning signal if the expected consumption quantity exceeds the quantity of reducing agent in the reducing agent storage tank.

14. The method of claim 12, further comprising:

effecting intervention measures to reduce a consumption rate for the reducing agent after a predetermined motor vehicle running distance has been exceeded following a warning signal being sent.

15. The method of claim 13, further comprising:

effecting intervention measures to reduce a consumption rate for the reducing agent after a predetermined motor vehicle running distance has been exceeded following a warning signal being sent.

16. The method of claim 12, further comprising restricting the driving speed of the motor vehicle or the rotational speed of the motor vehicle drive engine is restricted after a predetermined motor vehicle running distance has been exceeded following a warning signal being sent.

17. The method of claim 13, further comprising restricting the driving speed of the motor vehicle or the rotational speed of the motor vehicle drive engine is restricted after a predetermined motor vehicle running distance has been exceeded following a warning signal being sent.

* * * * *